(12) United States Patent
Walsh (10) Patent No.: US 9,733,478 B2
(45) Date of Patent: Aug. 15, 2017

(54) AMBIENT LIGHT MANAGEMENT FOR VIRTUAL REALITY GLASSES

(71) Applicant: THOMSON LICENSING, Issy de Moulineaux (FR)

(72) Inventor: Thomas Walsh, Somerset, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 35 days.

(21) Appl. No.: 14/677,889

(22) Filed: Apr. 2, 2015

(65) Prior Publication Data

US 2015/0286057 A1    Oct. 8, 2015

Related U.S. Application Data

(60) Provisional application No. 61/974,637, filed on Apr. 3, 2014.

(51) Int. Cl.
*G02B 27/01* (2006.01)
*G06F 3/01* (2006.01)

(52) U.S. Cl.
CPC ......... *G02B 27/0172* (2013.01); *G06F 3/017* (2013.01); *G02B 2027/0118* (2013.01); *G02B 2027/0178* (2013.01)

(58) Field of Classification Search
CPC ........ G02B 27/0172; G02B 2027/0118; G02B 2027/0178; G06F 3/017
See application file for complete search history.

(56) References Cited

U.S. PATENT DOCUMENTS

| | | | |
|---|---|---|---|
| 5,525,430 A * | 6/1996 | Chahroudi | B32B 17/10486 359/241 |
| 6,456,438 B1 | 9/2002 | Lee et al. | |
| 6,528,782 B1 * | 3/2003 | Zhang | B60J 3/04 250/205 |
| 6,762,801 B2 | 7/2004 | Weiss et al. | |
| 2008/0218434 A1 | 9/2008 | Kelly et al. | |
| 2010/0097293 A1 | 4/2010 | McMahon | |
| 2012/0242560 A1 | 9/2012 | Nakada et al. | |

(Continued)

FOREIGN PATENT DOCUMENTS

| JP | 2010-145674 A | 7/2010 |
|---|---|---|
| JP | 2012-204998 A | 10/2012 |

(Continued)

*Primary Examiner* — Lisa Landis
(74) *Attorney, Agent, or Firm* — Myers Wolin, LLC (57) ABSTRACT

A virtual reality glasses assembly is provided. The assembly includes virtual reality glasses having lenses. The assembly further includes light attenuating filters at least one of applied to and incorporated into the lenses that automatically maintain or increase a contrast of a projected virtual reality image and prevent ultraviolet light overexposure by adjusting an amount of light passing through the lenses. Each of the light attenuating filters has one or more respective photochromic filters and one or more respective ultraviolet filters. The assembly also includes light attenuating shutters at least one of applied to and incorporated into the lenses that automatically or manually further maintain or increase the contrast of the projected virtual reality image by further adjusting the amount of light passing through the lenses.

18 Claims, 5 Drawing Sheets

(56) References Cited

U.S. PATENT DOCUMENTS

| | | | |
|---|---|---|---|
| 2012/0242678 A1* | 9/2012 | Border | G02B 27/0093 345/589 |
| 2012/0326948 A1 | 12/2012 | Crocco et al. | |
| 2013/0242402 A1* | 9/2013 | Konig | G02B 3/0087 359/630 |
| 2014/0285429 A1* | 9/2014 | Simmons | G02B 27/225 345/156 |

FOREIGN PATENT DOCUMENTS

| | | |
|---|---|---|
| WO | 2012049189 A1 | 4/2012 |
| WO | 2012176201 A1 | 12/2012 |

* cited by examiner

AMBIENT LIGHT MANAGEMENT FOR VIRTUAL REALITY GLASSES

This application claims the benefit of U.S. Provisional Application Serial No. 61/974,637, filed Apr. 3, 2014, which is incorporated by reference herein in its entirety.

BACKGROUND

Currently, virtual reality (VR) glasses cannot control incoming light. Thus, in high brightness environments, a virtual image can become washed out.

One conventional solution involves controlling ambient light by turning off or dimming lights which can have the disadvantageous result of annoying other occupants in the environment.

Another conventional solution involves increasing the brightness of the rendering equipment which can lead to ocular discomfort.

SUMMARY

These and other drawbacks and disadvantages of the prior art are addressed by the present principles, which are directed to ambient light management for virtual reality glasses.

According to an aspect of the present principles, a virtual reality glasses assembly is provided. The assembly includes virtual reality glasses having lenses. The assembly further includes light attenuating filters at least one of applied to and incorporated into the lenses that automatically maintain or increase a contrast of a projected virtual reality image and prevent ultraviolet light overexposure by adjusting an amount of light passing through the lenses. Each of the light attenuating filters has one or more respective photochromic filters and one or more respective ultraviolet filters. The assembly also includes light attenuating shutters at least one of applied to and incorporated into the lenses that automatically or manually further maintain or increase the contrast of the projected virtual reality image by further adjusting the amount of light passing through the lenses.

According to another aspect of the present principles, a method is provided for managing an amount of light passing through lenses of virtual reality glasses. The method includes automatically maintaining or increasing a contrast of a projected virtual reality image and preventing ultraviolet light overexposure by adjusting the amount of light passing through the lenses using light attenuating filters at least one of applied to and incorporated into the lenses. Each of the light attenuating filters has one or more respective photochromic filters and one or more respective ultraviolet filters. The method further includes automatically or manually further maintaining or increasing the contrast of the projected virtual reality image by further adjusting the amount of light passing through the lenses using light attenuating shutters at least one of applied to and incorporated into the lenses.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to ambient light management for virtual reality glasses. Advantageously, the present principles maintain or enhance the contrast of a projected virtual reality image on the virtual reality glasses. Virtual reality glasses are a type of eyeglass that can present both the real world and overlaid virtual content to a viewer.

In an embodiment of the present principles, the contrast of virtual reality glasses is maintained or increased in high brightness environments by adding certain materials to the lens of the glasses. The materials advantageously reduce the amount of incoming or real world light. Thus, by adding materials to the glasses that limit incoming light, the virtual reality glasses can be made to automatically adjust to ambient light, allowing the virtual reality glasses to preserve the highest contrast available.

An embodiment provides light attenuating filters for virtual reality glasses. The light attenuating filters include photochromic filters coupled with ultraviolet (UV) light filters. Advantageously, the photochromic filters darken as the amount of ultraviolet light increases (i.e., one or more photochromic filters automatically darken as a function of ultraviolet light exposure).

However, photochromic filters have been associated with health concerns. To elaborate, the dimming of incoming light to the eyes can cause the pupils to dilate and, as a result, expose the eyes to more than normal ultraviolet light radiation and increase the likelihood of premature glaucoma. Advantageously, in employing an ultraviolet filter between the viewer's eyes and the photochromic filter, the present principles overcome the aforementioned deficiency associated with using only the photochromic filter, thus obviating the health concerns.

Another embodiment bolsters the advantages provided by the aforementioned light attenuating filters by combining the same with a smart glass technology that limits the amount of light passing through the glasses by the application of an electrical stimulation. Smart glass is glass that changes light transmission properties when voltage, current, and/or heat is applied. When activated, the smart glass changes from transparent to translucent, blocking some or all wavelengths of light. The smart glass technology is implemented as light attenuating shutters, which can be manually or automatically controlled. The smart glass technology is particularly advantageous indoors when ultraviolet light levels may not be high enough for the light attenuating filters to provide the desired light attenuation. In such a case, the smart glass technology can be used to further reduce the amount of incoming light incident upon a viewer's eyes.

Thus, while the photochromic filters will adjust to ambient light on their own, the smart glass technology can use an input to control the light level. For example, in an embodiment, a manual technique can be used to control the dimming for the smart glass technology. The manual technique can involve, for example, a physical input device, a virtual input device, and/or so forth.

In an embodiment, an automatic technique can be used to control the dimming for the smart glass technology. The virtual reality glasses can have an inbuilt camera and a processing subsystem that has some image processing capability. Moreover, one or more light detectors (e.g., photodiodes) can be used in addition to, or in place of, the camera. The processing subsystem can provide a whole lens filter index by analyzing the ambient light as captured in the images by the camera or as detected by the light detector.

In a more advanced embodiment, the virtual reality glasses can be configured to more exactly address the light sources in the field of view. For example, in an embodiment, the camera images and/or light detector output are processed to determine where light sources are positioned within the field of view, and corresponding areas of the lenses are correspondingly darkened to maintain an even field of view lighting.

It is to be appreciated that embodiments of the present principles combine the automatic approach of the light attenuating filters with the manual and/or automatic approaches of the light attenuating shutters.

Figure 1:
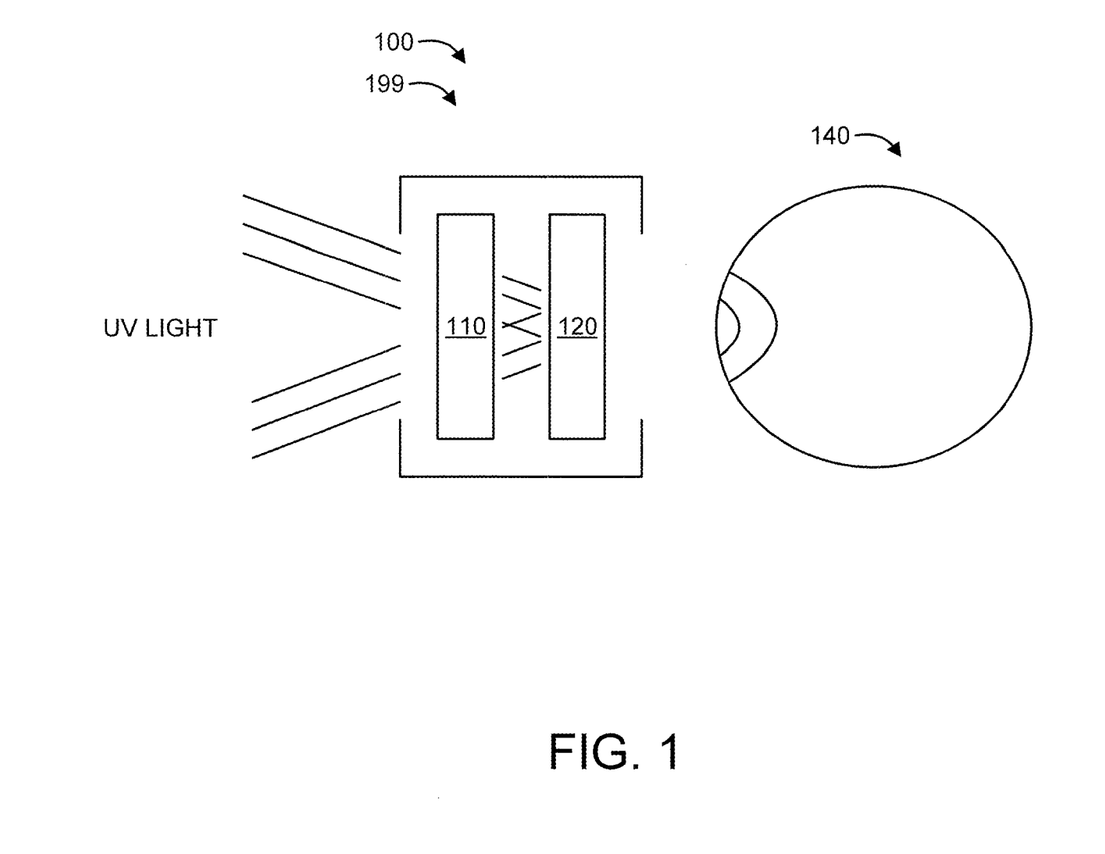
FIG. 1 shows a portion 100 of a pair of virtual reality glasses, in accordance with an embodiment of the present principles.

FIG. 1 shows a portion 100 of a pair of virtual reality glasses, in accordance with an embodiment of the present principles. The portion 100 includes light attenuating filters 199. The light attenuating filters 199 include photochromic filters coupled with ultraviolet (UV) light filters.

For the sake of illustration, a cross-sectional view of only part of one side of the pair of glasses is shown. Accordingly, only one photochromic filter 110 and only one ultraviolet filter 120 are shown. However, the same applies to the other side of the pair of glasses as readily appreciated by one of ordinary skill in the art given the teachings of the present principles provided herein. Moreover, it is to be appreciated that the present principles can be applied to one or both sides of a pair of glasses, depending upon the user and the corresponding implementation. That is, given a user's requirements, implementations of the present principles can involve only side of a pair of glasses or both sides, can involve using only one, only two or all three of the photochromic filters, the UV filters, and the shutters described herein, can involve different ones of the preceding on different sides of the pair of glasses and so forth. These and other variations and implementations of the present principles are readily determined by one of ordinary skill in the art given the teachings of the present principles provided herein, while maintaining the spirit of the present principles.

The photochromic filter 110 darkens responsive to an amount of ambient light, thus reducing the amount of (ambient) light to which a viewer's eyes 140 are exposed. Moreover, the ultraviolet light filter 120 further filters the amount of (ultraviolet) light to which a viewer's eyes are exposed, thus overcoming any health concerns associated with simply using the photochromic filters without more.

Figure 2:
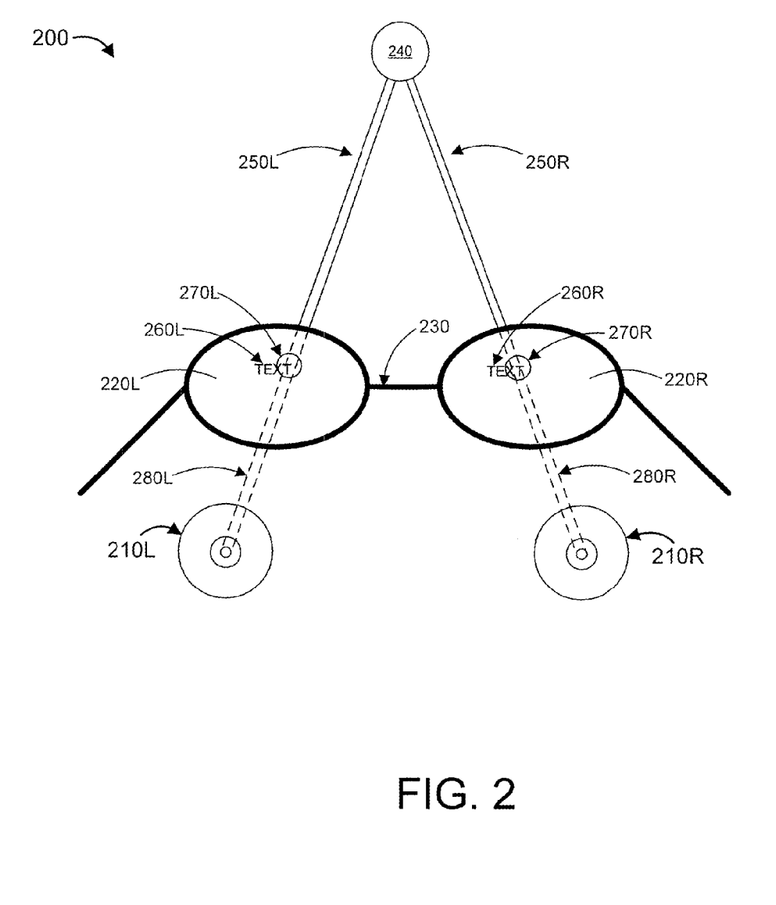
FIG. 2 shows a smart lens configuration 200 of virtual reality glasses, in accordance with an embodiment of the present principles.

FIG. 2 shows a smart lens configuration 200 of virtual reality glasses, in accordance with an embodiment of the present principles. As noted above, the smart lens configuration 200, implemented herein as light attenuating shutters, can be combined with the aforementioned light attenuating filters 199. However, for the sake of illustration, FIG. 2 shows the elements directed to the smart lens configuration without the aforementioned light attenuating filters 199.

Also for the sake of illustration, the following are shown with respect to the smart lens configuration 200: a left eye 210L, a right eye 210R, a left lens portion 220L, a right lens portion 220R, a frame portion 230, a light source 240, left side incident light 250L emanating from the light source 240, right side incident light 250R emanating from the light source 240, left side overlay text 260L, right side overlay text 260R, a left side light blocked region 270L, and a right side light blocked region 270R.

The left lens portion 220L reduces the amount of the left side incident light 250L passing through the left lens portion 220L (e.g., the left side light blocked region 270L), so that only a remaining reduced amount of incident light 280L reaches the viewer's left eye. The right lens portion 220R reduces the amount of the right side incident light 250R passing through the right lens portion 220R (e.g., the right side light blocked region 270R), so that only a remaining reduced amount of incident light 280R reaches the viewer's right eye.

Figure 3:
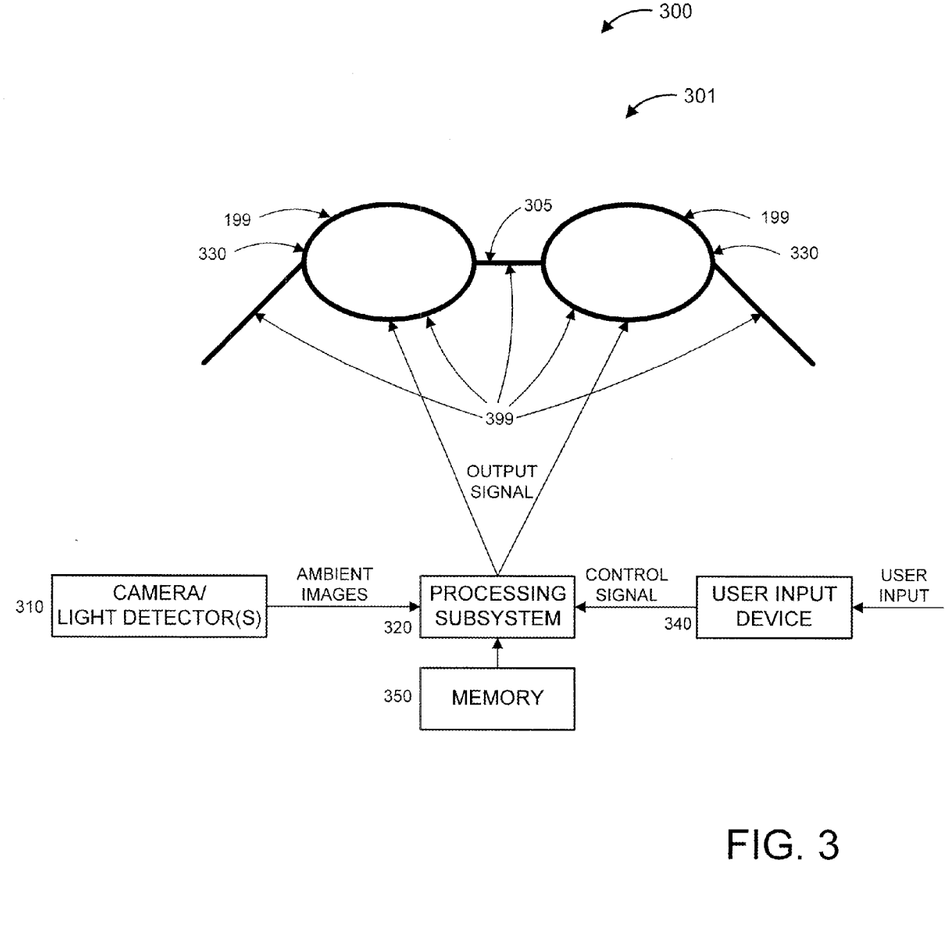
FIG. 3 shows another smart lens configuration 300 for virtual reality glasses, in accordance with an embodiment of the present principles.

FIG. 3 shows another smart lens configuration 300 having light attenuating shutters 301 for virtual reality glasses, in accordance with an embodiment of the present principles. The smart lens configuration 300 includes a frame 305, an inbuilt camera and/or inbuilt light detector(s) 310, an processing subsystem 320, lenses 330 responsive to an electrical stimulus (hereinafter "electrically stimulated lenses" or "smart glass lenses"), a user input device 340, and a memory 350. The camera and/or light detector(s) 310, processing subsystem 320, lenses 330, user input device 340, and memory 350 of the smart lens configuration 300 can be considered to form the light attenuating shutters 301. The shutters themselves can be considered to be lenses 330 with the other elements relating to the control of the shutters.

The smart lens configuration 300 can also incorporate the photochromic filters 110 and/or ultraviolet light filters 120 described above with respect to FIG. 1. In the embodiment of FIG. 3, the photochromic filters 110 and the ultraviolet light filters 120 are collectively referred to as "light attenuating filters" 199.

Possible frame locations 399 are indicated in FIG. 3, where one or more of these locations can be used to locate one or more of the elements (e.g., inbuilt camera and/or light detector(s) 310, processing subsystem 320, user input device 340, and memory 350) of the configuration 300 within the virtual reality glasses. For example, the light detector(s) 310 can be put around the portions of the frame that surround the lenses.

The virtual reality glasses assembly can comprise in the various embodiments the inbuilt camera for capturing ambient images in which the processing subsystem evaluates the ambient images to determine locations of light sources within a respective field of view of each of the lenses, and generates the output signal responsive to the determined locations and can provide for different levels of light transmission to different areas of the lenses responsive to the output signal.

The user input device 340 can be, for example, but is not limited to, a physical input device, a virtual input device, and/or so forth. The physical input device can be, for example, but is not limited to, a knob, a button, and/or a slider. In an embodiment, the physical input device can be the inbuilt camera 310, where the viewer uses gestures that are recognized and acted upon (gesture recognition). The captured gestures can be recognizing by comparing the captured gestures to a database of gestures stored in the memory 350. The virtual input device can be, for example, but is not limited to, a graphical user interface (GUI) element.

While shown as a separate element, memory 350 can be part of the processing subsystem 320.

The smart glass lenses 330 can be configured to react to differences in voltage, current, and so forth, depending upon the implementation. The smart glass can employ technologies that include, but are not limited to, electrochromic, suspended particle, micro-blind, nanocrystal, liquid crystal, and so forth. Of course, the present principles can be used with other smart glass technologies, while maintaining the spirit of the present principles.

In an embodiment, the user input device 340 can be omitted or supplemented by an automatic approach, where the captured images are evaluated by the processing subsystem 320 and control outputs are provided automatically by the subsystem 320 to control the smart glass lenses 330. In such an embodiment, the camera images are processed to determine where light sources are positioned within the field of view, and corresponding areas of the smart glass lenses 330 are correspondingly darkened to maintain an even field of view lighting. In place of, or in addition to, the camera, one or more light detectors 310 can be used to determine the positions of light sources within the field of view.

Thus, in an embodiment relating to FIG. 3, a smart lens configuration 300 can involve a manual approach and/or an automatic approach. In the manual approach, the user determines the adjustment to the smart glass lenses 330 by providing a user input via the user input device 310. The processing subsystem 320 provides an output signal responsive to the user input. The smart glass lenses 330 adjust the amount of light incident upon the viewer's eyes responsive to the output signal. In the automatic approach, the adjustment to the smart glass lenses 330 can be determined automatically by the processing subsystem 320. In such a case, the processing subsystem 320 analyzes the ambient images captured by the inbuilt camera 310 or outputs of one or more light detectors 310 to identify the locations of light sources within the field of view, and provides one or more output signals for controlling respective areas of the lenses 330. Of course, in an embodiment, a pair of virtual reality glasses can be configured that incorporates both the manual approach and the automatic approach.

Hence, the aforementioned functions performed by the smart lens configuration 300 enable a high contrast to be maintained or enhanced, particularly in a bright viewing environment. In this way, the viewer's viewing experienced is maximized.

These and other variations of the elements of FIG. 3 are readily determined by one of ordinary skill in the art given the teachings of the present principles provided herein, while maintaining the spirit of the present principles.

Figure 4:
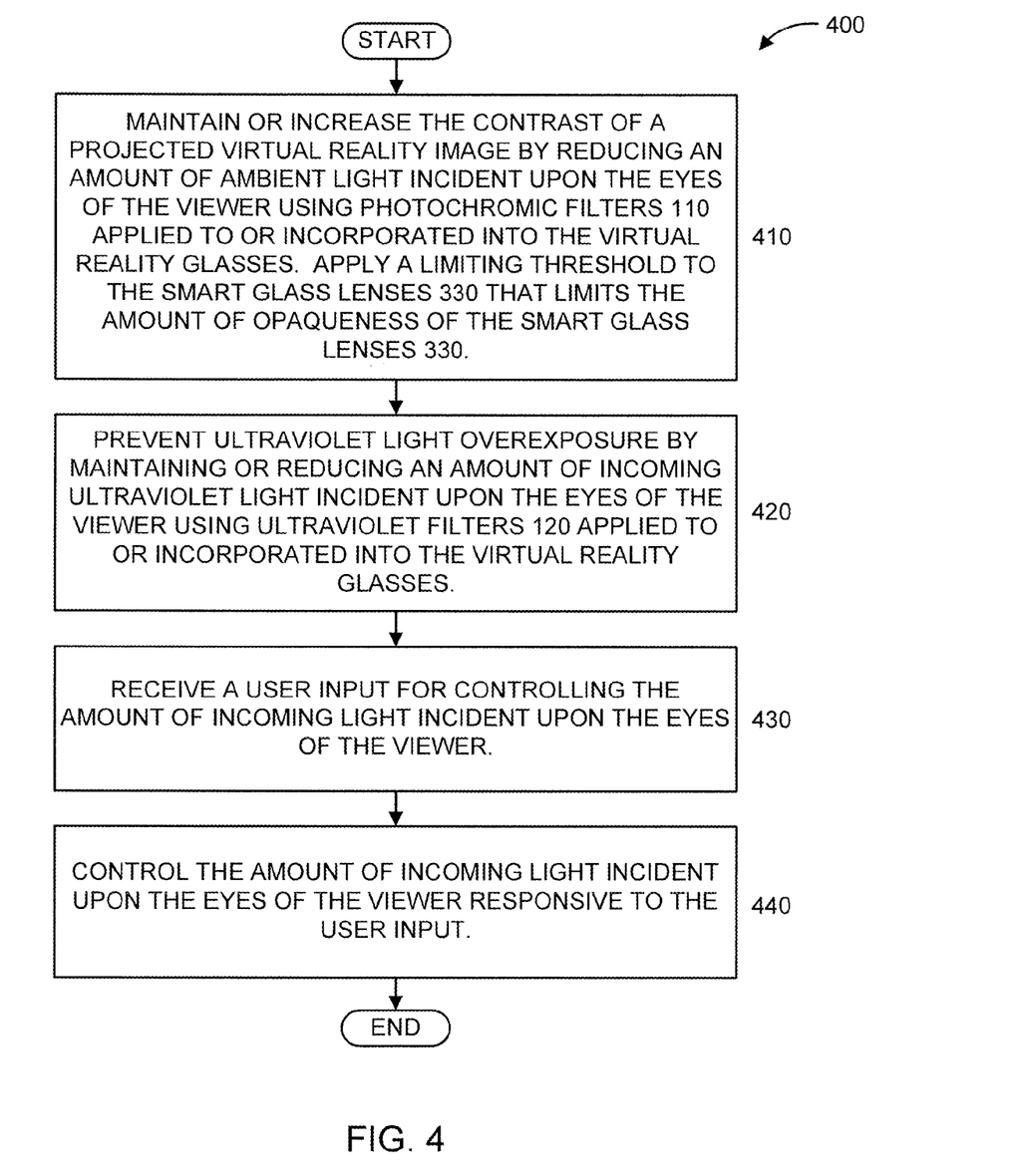
FIG. 4 shows a method 400 for managing an amount of light incident upon the eyes of a viewer of virtual reality glasses, in accordance with an embodiment of the present principles.
Figure 5:
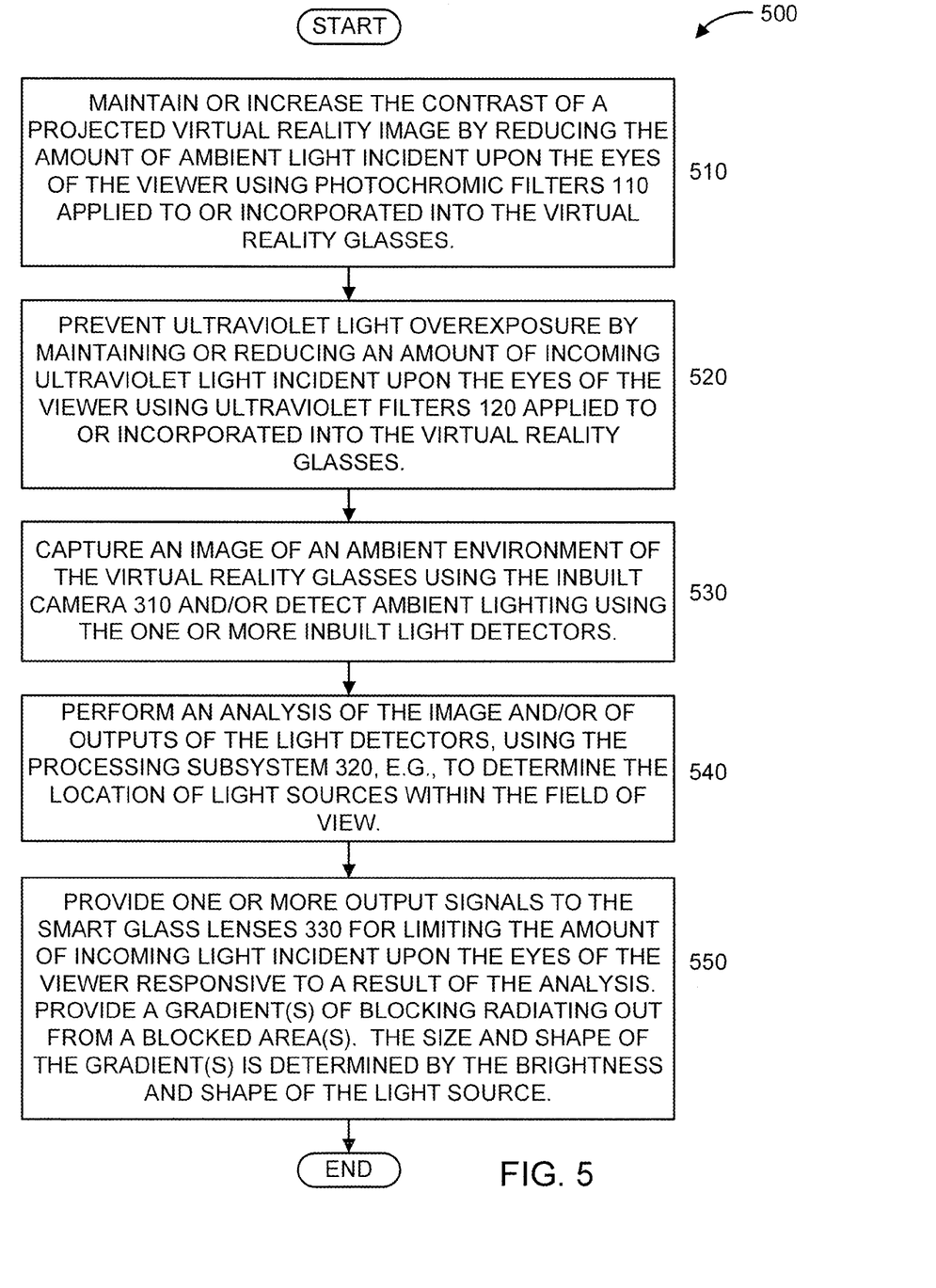
FIG. 5 shows another method 500 for managing an amount of light incident upon the eyes of a viewer of virtual reality glasses, in accordance with an embodiment of the present principles.

FIGS. 4 and 5 that follow respectively describe a manual approach and an automatic approach for controlling the smart lens technology, while also employing the aforementioned light attenuating filters 199.

FIG. 4 shows a method 400 for managing an amount of light incident upon the eyes of a viewer of virtual reality glasses, in accordance with an embodiment of the present principles.

At step 410, maintain or increase the contrast of a projected virtual reality image by reducing an amount of ambient light incident upon the eyes of the viewer using photochromic filters 110 applied to or incorporated into the virtual reality glasses. The photochromic filters 110 permit a reduced amount of ambient light to pass there through. Each side of the virtual reality glasses includes at least one photochromic filter 110.

Since completely opaque lenses could represent a hazard for the user, as the ambient or localized light increases it could be useful to have a limiting function/threshold that prevents the lenses that include the smart glass lenses 330 from becoming completely opaque either over the entire surface or as a function of smaller regions of the lens surface. Thus, in an embodiment, step 410 includes applying a limiting threshold to the smart glass lenses 330 that limits the amount of opaqueness of the smart glass lenses 330.

At step 420, prevent ultraviolet light overexposure of the eyes of the viewer by maintaining or reducing an amount of incoming ultraviolet light incident upon the eyes of the viewer using ultraviolet light filters 120 applied to or incorporated into the virtual reality glasses. The ultraviolet light filters 120 permit a reduced amount of ultraviolet light to pass there through. Each side of the glasses could include at least one ultraviolet light filter 120. In an embodiment, the ultraviolet light filter 120 is arranged closer to the viewer than the photochromic filter 110.

At step 430, receive a user input for controlling the amount of incoming light incident upon the eyes of the viewer. The user input can be received using, for example, but not limited to, a physical input device, a virtual input device (e.g., a graphical user interface element, etc.), and/or so forth. Of course, the present principles are not limited to solely the preceding input types and, thus, other input types can also be used in accordance with the teachings of the present principles, while maintaining the spirit of the present principles.

At step 440, control the amount of incoming light incident upon the eyes of the viewer responsive to the user input. In this way, a viewer is provided with direct control over his or her viewing environment with respect to the amount of incoming light passing through the virtual reality glasses.

FIG. 5 shows another method 500 for managing an amount of light incident upon the eyes of a viewer of virtual reality glasses, in accordance with an embodiment of the present principles.

At step 510, maintain or increase the contrast of a projected virtual reality image by reducing an amount of ambient light incident upon the eyes of the viewer using photochromic filters 110 applied to or incorporated into the virtual reality glasses. The photochromic filters 110 permit a reduced amount of ambient light to pass there through. Each side of the virtual reality glasses includes at least one photochromic filter 110.

At step 520, prevent ultraviolet light overexposure of the eyes of the viewer by maintaining or reducing an amount of incoming ultraviolet light incident upon the eyes of the viewer using ultraviolet light filters 120 applied to or incorporated into the virtual reality glasses. The ultraviolet light filters 120 permit a reduced amount of ultraviolet light to pass there through. Each side of the glasses could include at least one ultraviolet light filter 120. In an embodiment, the ultraviolet light filter 120 is arranged closer to the viewer than the photochromic filter 110.

At step 530, capture an image of an ambient environment of the virtual reality glasses using the inbuilt camera 310 and/or detect ambient lighting using the one or more inbuilt light detectors 310.

At step 540, perform an analysis of the image and/or of outputs of the light detectors, using the processing subsystem 320, e.g., to determine the location of light sources within the field of view.

At step 550, provide one or more output signals to the smart glass lenses 330 for limiting the amount of incoming light to the virtual reality glasses responsive to a result of the analysis. For example, the output signals are provided to control corresponding areas of the smart glass lenses 330 by darkening these areas to maintain an even (i.e., uniform) field of view lighting. In an embodiment, the smart glass lenses can provide a gradient(s) of blocking radiating out from a blocked area(s). This is to compensate for excess light in the surrounding area relative to the blocked area. In an embodiment, the size and opacity of the gradient is determined by the brightness and shape of the light source (s). In such a case, the analysis performed at step 540 can determine the brightness and shape of the light source(s).

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state photochromic diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Reference in the specification to "an embodiment" of the present principles, as well as other variations thereof, means that a particular feature, structure, characteristic, and so forth described in connection with the embodiment is included in at least one embodiment of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A virtual reality glasses assembly, comprising:
   virtual reality glasses having lenses;
   light attenuating filters at least one of applied to and incorporated into the lenses that maintain or increase a contrast of a projected virtual reality image on the lenses with ambient light and prevent ultraviolet light overexposure by adjusting an amount of light passing through the lenses, each of the light attenuating filters having one or more respective photochromic filters that darken as a function of ultraviolet light exposure and one or more respective ultraviolet filters; and
   light attenuating shutters at least one of applied to and incorporated into the lenses that further maintain or increase the contrast of the projected virtual reality image on the lenses with ambient light by further adjusting the amount of light passing through the lenses when ultraviolet light level is not high enough for the light attenuating filters to provide a desired level of light attenuation.

2. The virtual reality glasses assembly of claim 1, further comprising a limiting function preventing the lenses from becoming completely opaque over a lens surface when the amount of light passing through the lenses is adjusted.

3. The virtual reality glasses assembly of claim 1, further comprising:
   a processing subsystem for providing an output signal to the light attenuating shutters responsive to a control signal, the output signal for controlling the amount of light passing through the light attenuating shutters, and
   wherein the light attenuating shutters selectively adjust the amount of light passing through the light attenuating shutters responsive to the output signal.

4. The virtual reality glasses assembly of claim 3, further comprising a user input device for receiving a user input and providing the control signal responsive to the user input, the user input specifying a light input adjustment.

5. The virtual reality glasses assembly of claim 3, further comprising:
   an inbuilt camera for capturing ambient images of one or more user gestures; and
   a memory for storing a plurality of sample user gestures, wherein the processing subsystem compares the ambient images captured by the inbuilt camera to the plurality of sample user gestures to recognize the control signal from the one or more user gestures.

6. The virtual reality glasses assembly of claim 3, further comprising an inbuilt camera for capturing ambient images, and wherein the processing subsystem evaluates the ambient images to determine locations of light sources within a respective field of view of each of the lenses, and generates the output signal responsive to the determined locations.

7. The virtual reality glasses assembly of claim 6, wherein different levels of light transmission are provided to different areas of the lenses responsive to the output signal.

8. The virtual reality glasses assembly of claim 7, wherein the processing subsystem generates the output signal to provide uniform field of view lighting to maintain or increase the contrast of the projected virtual reality image on the lenses.

9. The virtual reality glasses assembly of claim 3, further comprising one or more light detectors for providing one or more respective light detector output signals responsive to detecting ambient light, and wherein the processing subsystem evaluates the one or more light detector output signals to determine locations of light sources within a respective field of view of each of the lenses, and generates the output signal responsive to the determined locations.

10. The virtual reality glasses assembly of claim 9, wherein the light attenuating shutters provide one or more blocking gradients radiating out from one more respective light blocked areas, a size and an opacity of the one or more gradients determined by a brightness and a shape of at least one of the light sources.

11. A method for managing an amount of light passing through lenses of virtual reality glasses, the method comprising:
maintaining or increasing a contrast of a projected virtual reality image on the lenses with ambient light and preventing ultraviolet light overexposure by adjusting the amount of light passing through the lenses using light attenuating filters at least one of applied to and incorporated into the lenses, each of the light attenuating filters having one or more respective photochromic filters that darken as a function of ultraviolet light exposure and one or more respective ultraviolet filters; and
further maintaining or increasing the contrast of the projected virtual reality image on the lenses with ambient light by further adjusting the amount of light passing through the lenses using light attenuating shutters at least one of applied to and incorporated into the lenses when ultraviolet light level is not high enough for the light attenuating filters to provide a desired level of light attenuation.

12. The method of claim 11, further comprising providing an output signal to the light attenuating shutters responsive to a control signal, the output signal for controlling the amount of light passing through the light attenuating shutters, and wherein the amount of light passing through the light attenuating shutters is selectively adjusted responsive to the output signal.

13. The method of claim 12, further comprising:
receiving a user input specifying a light input adjustment; and
providing the control signal responsive to the user input.

14. The method of claim 12, further comprising:
capturing ambient images of one or more user gestures;
storing a plurality of sample user gestures;
comparing the ambient images to the plurality of sample user gestures to recognize the control signal from the one or more user gestures.

15. The method of claim 11, further comprising:
capturing ambient images;
evaluating the ambient images to determine locations of light sources within a respective field of view of each of the lenses; and
generating the output signal responsive to the determined locations.

16. The method of claim 15, wherein different levels of light transmission are provided to different areas of the lenses responsive to the output signal, and the output signal is generated to provide uniform field of view lighting to maintain or increase the contrast of the projected virtual reality image on the lenses.

17. A non-transitory article of manufacture tangibly embodying a computer readable program which when executed causes a computer to perform;
maintaining or increasing a contrast of a projected virtual reality image on the lenses with ambient light and preventing ultraviolet light overexposure by adjusting the amount of light passing through the lenses using light attenuating filters at least one of applied to and incorporated into the lenses, each of the light attenuating filters having one or more respective photochromic filters that darken as a function of ultraviolet light exposure and one or more respective ultraviolet filters; and
further maintaining or increasing the contrast of the projected virtual reality image with ambient light by further adjusting the amount of light passing through the lenses using light attenuating shutters at least one of applied to and incorporated into the lenses when ultraviolet light level is not high enough for the light attenuating filters to provide a desired level of light attenuation.

18. The method of claim 11, further comprising preventing the lenses from becoming completely opaque over a lens surface when the amount of light passing through the lenses is adjusted.

* * * * *

UNITED STATES PATENT AND TRADEMARK OFFICE
CERTIFICATE OF CORRECTION

| | | |
|---|---|---|
| PATENT NO. | : 9,733,478 B2 | Page 1 of 1 |
| APPLICATION NO. | : 14/677889 | |
| DATED | : August 15, 2017 | |
| INVENTOR(S) | : Thomas Walsh | |

It is certified that error appears in the above-identified patent and that said Letters Patent is hereby corrected as shown below:

In the Claims

At Column 9, Line 7, Claim 10, delete "one more" and insert --one or more--

At Column 10, Line 23, Claim 17, delete "on the" and insert --on--

Signed and Sealed this
Second Day of January, 2024

*Katherine Kelly Vidal*

Katherine Kelly Vidal
*Director of the United States Patent and Trademark Office*